United States Patent [19]

Harris

[11] Patent Number: 4,766,790

[45] Date of Patent: * Aug. 30, 1988

[54] BAND SAW APPARATUS AND METHOD

[76] Inventor: Gerald R. Harris, P.O. Box 1148, Pryor, Okla. 74361

[*] Notice: The portion of the term of this patent subsequent to Dec. 17, 2002 has been disclaimed.

[21] Appl. No.: 609,429

[22] Filed: May 11, 1984

Related U.S. Application Data

[63] Continuation-in-part of Ser. No. 577,527, Feb. 6, 1984, Pat. No. 4,558,614.

[51] Int. Cl.$^4$ .................. B23D 53/04; B23D 55/08
[52] U.S. Cl. .......................... 83/56; 83/72; 83/789; 83/796; 83/801; 83/820
[58] Field of Search ............... 83/13, 74, 76, 72, 788, 83/789, 796, 797, 798, 799, 800, 801, 806, 810, 811, 812, 820, 56

[56] References Cited

U.S. PATENT DOCUMENTS

| | | |
|---|---|---|
| 2,601,576 | 6/1952 | Wells et al. |
| 3,077,132 | 2/1963 | Whitmore .............................. 83/74 |
| 3,682,030 | 8/1972 | Harris .............................. 83/201.04 |
| 3,789,717 | 2/1974 | Stolzer .............................. 83/796 |
| 3,875,839 | 4/1975 | Aizawa .............................. 83/800 |
| 4,023,448 | 5/1977 | Bertini .............................. 83/661 |
| 4,117,756 | 10/1978 | Harris .............................. 83/801 |
| 4,127,045 | 11/1978 | Blucher et al. .............................. 83/796 |
| 4,160,397 | 7/1979 | Bertini .............................. 83/661 |
| 4,195,543 | 4/1980 | Tapply et al. .............................. 83/794 |
| 4,205,571 | 6/1980 | Bertini .............................. 83/661 |
| 4,363,254 | 12/1982 | Aizawa et al. .............................. 83/800 |
| 4,369,686 | 1/1983 | Sugimoto .............................. 83/801 |
| 4,437,367 | 3/1984 | Hauser .............................. 83/74 |
| 4,478,120 | 10/1984 | Sugimoto .............................. 83/71 |
| 4,481,845 | 11/1984 | Sakurai et al. .............................. 83/13 |
| 4,487,097 | 12/1984 | Hara et al. .............................. 83/788 |
| 4,546,682 | 10/1985 | Howard .............................. 83/13 |

FOREIGN PATENT DOCUMENTS

| | | |
|---|---|---|
| 3020377 | 12/1980 | Fed. Rep. of Germany. |
| 137786 | 4/1978 | Japan. |
| 2055325 | 3/1981 | United Kingdom. |

OTHER PUBLICATIONS

Marvel Series 18 and 24 Hack Saws "Armstrong-Blum Manufacturing Co." Catalog 18/2400 of Chicago, Ill.

Primary Examiner—Frank T. Yost
Assistant Examiner—Hien H. Phan
Attorney, Agent, or Firm—Flehr, Hohbach, Test, Albritton & Herbert

[57] ABSTRACT

Band saw apparatus is disclosed which includes a drive assembly formed for support and guided movement of a saw blade for cutting of a workpiece, an endless band saw blade mounted to the drive assembly, and reciprocation apparatus formed for reciprocation of the blade toward and away away from the workpiece to enable see-sawing of the blade and variation of the force per unit area of the cutting edge of the blade on the workpiece while maintaining the same total force on the blade. To enhance toward and efficiency of cutting the blade drive assembly is mounted to the remainder of the saw to be substantially free to rebound or move away from the workpiece during reciprocation to avoid digging in or shearing off of the blade teeth and to permit close spacing of the blade guides next to the workpiece. The saw includes a control circuit for controlling the rate of movement of the saw arm away from and toward the workpiece to enable timing of saw arm rebound to blade displacement. The blade guides are reciprocated by the fluid piston-cylinder assemblies in synchronism or out-of-phase to vary the amplitude, frequency, speed and dwell during displacement independently of blade speed and at two locations along a length of the blade so as to produce see-sawing oscillation as well as simple reciprocation. The blade guide assemblies are provided with displacement means to permit guide assembly adjustment during cutting to maintain the guide assemblies in close proximity to the workpiece. Alternative blade displacement assembly constructions and a method for cutting workpieces employing the apparatus also are disclosed. The method includes variation of the feed rate of the saw blade down through the workpiece as a function of the width of the workpiece.

17 Claims, 5 Drawing Sheets

BAND SAW APPARATUS AND METHOD

RELATED APPLICATION

This application is a continuation-in-part application based upon copending application Ser. No. 577,527 filed Feb. 6, 1984 and entitled "Band Saw Apparatus and Method," now U.S. Pat. No. 4,558,614 and the subject of Reexamination Certificate No. 661, issued Mar. 31, 1987.

BACKGROUND OF THE INVENTION

The present invention relates, in general, to band saw apparatus suitable for cutting relatively hard metal objects and, more particularly, relates to a band saw apparatus and a method for enhancing the cutting rates, the cutting precision and the blade life by minimizing the area of the workpiece engaged by the cutting edge of the blade during cutting.

Various attempts have been made to enhance the cutting rate of a band saw when cutting hard materials. One approach is to form the band saw blade with a height dimension which varies along the length of the blade. Typical of such efforts is the apparatus set forth in U.S. Pat. Nos. 4,205,571, 4,195,543, 4,160,397 and 4,023,448. In these patents an endless band saw blade is formed with a varying height dimension or side elevational profile so that, as the height variations pass over guide means, the blade is urged toward and then permitted to move away from the workpiece.

In most cases such specially formed band saw blades are actually employing a well known principle for improving cutting efficiency, namely, they are formed to reduce the area being engaged by the saw teeth by see-sawing the blade as it is advanced. (See, e.q., U.S. Pat. Nos. 4,160,397, column 2 lines 37-41, 4,205,571, column 2, lines 7-10). In some cases the blade is formed and the guides are set to displace the blade directly toward the workpiece without see-sawing or rocking, but more typically there is angular displacement.

When hard metallic workpieces are being cut, the saw blade teeth tend to be displaced into the workpiece only to a small degree before there is a reaction force which tends to move the saw arm (or drive wheel support frame) away from the workpiece. Thus, after some initial set or small penetration of the teeth into the work, the remainder of the displacement resulting from blade height variations tends to produce upward movement of the saw arm away from the workpiece. Since band saws typically include a pneumatic or hydraulic feed cylinder and control circuits and associated feed linkage which control the rate at which the saw is advanced through the workpiece, the feed cylinder and control circuit act as a constraint against free movement of the band saw.

In some saws the feed cylinder and control circuitry will not let the arm back rapidly away from the workpiece to accomodate variations in blade height which are greater than the initial set of the teeth into the hard metallic workpiece. This will cause the saw blade to bend and to be stressed. In other saws, the feed assembly will allow the saw to move away from the workpiece as the blade height increases, but will not allow a rapid return toward the workpiece as the valleys in the blade are passed over the blade guides. If the return toward the workpiece which is induced by the valleys in the blade height is at rate which is greater than the feed rate, the feed cylinder and control circuit retard the arm movement to the saw arm back toward the workpiece feed rate. Such retarding or slowing of the saw arm movement results in a dramatic reduction in cutting force while the saw arm tries to catch up to the blade displacement. In the extreme the force will be zero and stressful bouncing and bending of the blade will occur. This cutting force reduction reduces cutting efficiency during part of the cutting process, although the overall efficiency is improved as a result of the improvement during the portion of the cut in which the blade is being urged toward the workpiece and the arm is rebounding away from the workpiece.

Although not specifically recognized in the prior art, the effect of the feed cylinder constraint has heretofore been accommodated in one of two ways. First, the height variation along the blade can be selected so that it is not substantially greater than the depth to which the teeth can be initially set or driven into the work. The disadvantage of this "solution" is that it does not maximize cutting efficiency. A second approach is to spread the blade guides from the workpiece sufficiently to enable bending of the saw blade along the longitudinal axis of the blade to accomodate restraint in either the movement toward or away from the workpiece. This results in bowing of the blade and produces angular variations which reduce the see-sawing effect. This "solution," however, is very disadvantageous in that it can fatigue the blade, and it will cause wandering of the blade as it cuts through the work. The amount of deviation of the saw blade from a straight line cut is proportional to the third power of the separation of the guides from each other.

If the blade guides are set next to the workpiece so that blade bending is insignificant, and if the height variation is too great, feed cylinder constraint will cause the teeth to dig into the workpiece to a degree which will either stop the saw or shear off the teeth from the blade. Since this possibility is unacceptable, specially formed prior art blades either have had limited height variations or have been used with blade guides which are spaced from the workpiece, or compromises of both approaches.

Ideally, however, enhance cutting efficiency is obtained when the teeth are urged into the workpiece beyond the initial set to just short of digging in to a point which would stop the saw or shear the teeth. For maximum efficiency in the cutting of a hard metallic material, the teeth should be forced into the material until they start to dig in so they will cut and pull a chip and then the teeth should be released before shearing or stalling of the saw. Moreover, the cutting force should be applied and maintained as a substantially constant force, below the force which will cause the teeth to dig in, for as long as possible during the entire blade displacement cycle. Additionally, and most preferably, the area being cut at any time should be minimized by seesawing or rocking of the saw blade so as to increase the pressure per unit area of the teeth and ease penetration of the material being cut without having to increase the total force on the blade.

Specially formed saw blades have other disadvantages. It is inherent that in a sinusoidal, stepped or otherwise specially formed blade the areas of the blade which project outwardly toward the workpiece the farthest will undergo the greatest amount of stress and wear. Thus, over the length of a band saw blade, all of the downwardly projecting areas will tend to wear first and to have the greatest potential for blade fatiguing stress risers.

It is possible to change specially formed blades to vary the amplitude of blade displacement and thus, to some degree, the see-saw cutting action and pressure applied, and it also is possible to vary the cutting speed to change the frequency of pressure variation. These changes, however, are not easily or quickly accomplished. For band saw apparatus in which the production runs are short and the materials being cut are changed frequently, for example, in a job-shop, repeated blade changing can be a substantial disadvantage.

Another approach to achieving a see-saw cutting action and thereby varying the pressure applied by a band saw blade during cutting is disclosed in U.S. Pat. No. 4,127,045. In this patent a pivotal arm band saw is shown which has a blade guiding assembly that is formed to displace the saw blade toward and permit movement away from the workpiece by a stepcam and follower.

The cutting dynamics for the apparatus of U.S. Pat. No. 4,127,045 are the same as above described for specially formed blades. As the cam pushes the blade toward the workpiece and saw table, the blade flexes between the blade guides and the workpiece because the arm feed cylinder resists reaction displacement of the arm upwardly. The guides in U.S. Pat. No. 4,127,045 are widely spaced from the workpiece which will permit blade flexure. Displacement of the blade toward the work table by one guide does change the angle of engagement of the workpiece with the work to enable a see-saw cutting action, but the wide setting of the guides and the constraint of the cutting arm by the feed cylinder inhibit the effectiveness of such see-saw action and the depth to which the teeth are driven into the workpiece.

Generally it is well known in the cutting art, and particularly in connection with power hack saws and power grinders, to vary the angle of cutting during the cut. MARVEL brand hack saws, produced by Armstrong-Blum Manufacturing Co. of Chicago, Ill. for example, have for many years used a "Roll Stroke" blade motion which progressively raises one end of the saw blade while lowering the other as the blade is drawn through the work. This action is repeated many times over the full cut of the workpiece. Grinders similarly have been constructed in which the pivotal arm upon which the abrasive wheel is mounted is itself eccentrically mounted to displace the pivot point of the arm and thereby vary the area being cut. It also is common machining practice to rotate or roll the workpiece as it is cut to reduce the area engaged at any time by the cutting tool, and all of these methods maintain higher unit cutting forces by reducing the cutting area.

In the same manner as see-sawing reduces the area of a workpiece being engaged by the saw blade, the shape of the workpiece, and particularly the width dimension, can effect the cutting rate substantially. A piece of round stock, for example, initially presents a relatively small area (length along the blade) to be cut. As the blade cuts through the cylinder, the area increases until the center of the workpiece is reached. The area of the workpiece along the blade which is being cut then diminishes as the blade moves down to the bottom of the workpiece.

The effect of the changing area of engagement of the saw blade with the workpiece as a function of workpiece shape on the efficiency of cutting workpieces has not been considered in any detail. While see-sawing the blade and/or using specially formed stepped or wavy blades enhances efficiency, the effeciency of cutting a workpiece can be further enhanced by considering workpiece width at various times during the cut and making adjustments to saw performance characteristics such as feed rate, blade oscillation, cutting pressure and/or blade speed. Moreover, such variations also can be used to enhance cutting effeciency in connection with conventional non-oscillating or vibrating saws.

OBJECTS AND SUMMARY OF THE INVENTION

A. Objects of the Invention

It is an object of the present invention to provide band saw apparatus and a method for cutting hard workpieces which enhances cutting efficiency and yet maintain substantial blade life.

It is another object of the present invention to provide band saw apparatus and a method in which the advantages of see-saw cutting are combined with the advantages of a more optimum depth of penetration of the blade teeth into a hard workpiece to improve cutting efficiency.

It is a further object of the present invention to provide band saw apparatus in which the frequency, amplitude, displacement speed and duration of cutting along a given area can be varied without regard to cutting speed or blade configuration to enable tuning of cutting to the specific workpiece being cut.

Another object of the present invention is to provide band saw apparatus and method in which the angle of engagement of the workpiece by the cutting edge of the blade and the see-sawing cutting action can be more efficiently varied during cutting so as to enhance the efficiency and reduce the time of cutting.

Still a further object of the present invention is to provide a method for cutting a metallic workpiece which affords greater cutting efficiency, while minimizing cutting blade fatigue, and to distribute wear along the total length of the blade.

Still another object of the present invention is to provide a method for cutting a hard metallic workpiece or the like which reduces the set up time between the cutting of different materials or objects, provides the user with greater flexibility and control during cutting, and allows tailoring of cutting to the shape of the workpiece being cut.

Another object of the present invention is to provide an improved method for cutting workpieces having a width dimension which varies with the depth of cut.

Still a further object of the present invention is to provide band saw blade displacement apparatus which can be easily adapted to existing band saws to enhance cutting efficiency and which can be employed on both vertical and horizontal band saws.

Still another object of the present invention is to provide band saw apparatus which is durable, easy to use, and employs standard band saw cutting blades.

The band saw apparatus and method of the present invention have other features and objects which will be apparent from, or are set forth in more detail in, the accompanying drawing and following description of the preferred embodiments.

B. Summary of the Invention

The band saw apparatus of the present invention includes blade drive means formed for support and guided movement of a saw blade for cutting a workpiece and including movable carriage means, an endless band saw blade mounted to the drive means, feed means coupled for relative advancement of said carriage means toward said workpiece and displacement or reciprocation means formed to produce variation of the cutting area of the workpiece during movement of the saw blade. In one aspect, the improvement in the band saw apparatus of the present invention comprises, briefly, the feed means being formed for and disengaged from advancement of the carriage means to permit substantially unconstrained movement of the carriage toward and away from the workpiece in response to displacement of the saw blade by said displacement means toward the workpiece.

In the preferred form, blade guides include guide block elements mounted in sliding engagement with a back edge of the saw blade, and the guide elements are in turn mounted on and coupled to (directly or through levers) fluid actuators so that displacement at relatively spaced-apart locations along the back edge of the blade toward and away from the workpiece can be accomplished. The frequency, amplitude, displacement speed, duration and phasing between the two spaced-apart reciprocating guide assemblies also can be independently varied so as to tune vibration and cutting area variations to the specific material and object being cut for a maximum cutting efficiency. Disengaging the feed means to free the carriage for reaction to blade displacement prevents digging in of the teeth, allows a more constant cutting force to be applied during the cut, and permits the guides to be set in close proximity to the workpiece for greater cutting accuracy.

For workpieces of varying width dimension over the depth of the cut, the band saw apparatus preferably includes guides which are movable and can be laterally displaced during cutting so as to be position as close to the workpiece as possible during the entire cut. Additionally, the sawing apparatus includes a controller, most preferably a computer, for varying, over the depth of cut, the feed rate, the displacement parameters of the blade, and the blade speed, all as a function of the width of the workpiece being cut.

The method of cutting a workpiece of the present invention includes the steps of moving a saw blade across the workpiece to effect cutting and simultaneously varying the force per unit area of the blade against the workpiece. In the improved method of the present invention, the displacement occurs with the band saw frame or carriage being free to move toward and away from the workpiece as may be required. Moreover, the rate of feeding of the saw blade is varied to accommodate changes in the width dimension of the workpiece over the depth of cut.

DESCRIPTION OF THE PREFERRED EMBODIMENTS

Figure 1:
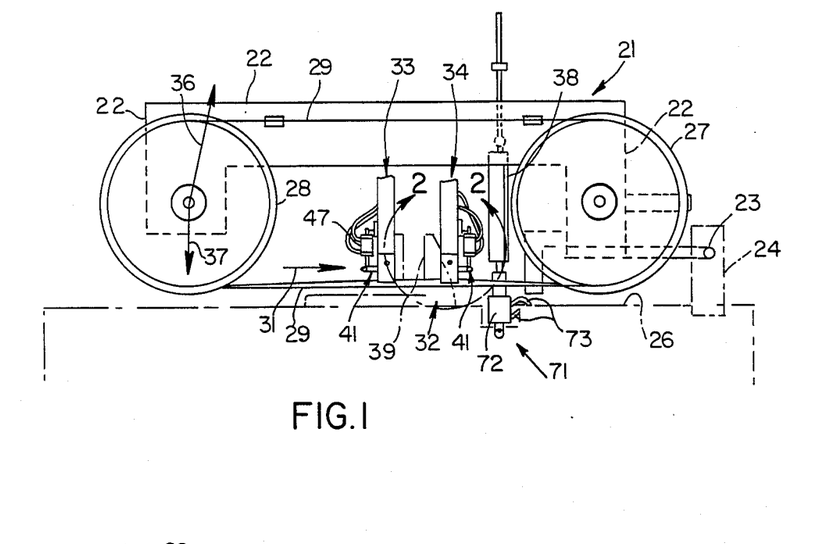
FIG. 1 is a side elevational view of the arm portion of a pivotal arm, horizontal band saw with the wheel housing removed and including the blade displacement apparatus of the present invention.

The method and apparatus of the present invention are suitable for use with a wide variety of horizontal and vertical band saws. For purposes of illustration, FIG. 1 shows a horizontal, pivotal arm, band saw constructed in a manner more fully set forth in my U.S. Pat. No. 3,682,030, but having mounted thereon the band saw blade displacement apparatus of the present invention. Band saw 21 includes a horizontally extending arm 22 which is pivotally mounted at 23 to mounting flange 24 extending upwardly from base 26 of the saw. Rotatably mounted proximate opposite ends of arm 22 are a drive wheel 27 and an idler wheel 28 upon which an endless band saw blade 29 is movably mounted. Saw blade 29 advances in the direction of arrow 31 across a cutting stretch 32 between a pair of spaced apart guide assemblies 33 and 34. Arm 22 acts as a movable frame or carriage means which can be advanced toward the workpiece as the saw blade cuts through the workpiece. As will be understood, however, the use of a pivotal arm band saw for purposes of illustration shall not limit the applicability of the apparatus and method of the present invention to such saws, and the present invention may be easily adapted for use with either horizontal or vertical band saws with frames or carriages which do not pivot.

Pivotal arm band saw 21 can be displaced in the direction of arrows 36 and 37 by pneumatic lift cylinder or feed means 38 mounted on base 26. The arm is initially lifted upwardly in the direction of arrow 36 until it is above a workpiece (not shown but normally held by vice means 39). Cylinder or feed means 38 then allows the saw arm to pivot about mount 23 downwardly in the direction of arrow 37 as a saw blade is advanced so as to cut the workpiece. In many band saws lift cylinder 38 actually supports arm 22 as it descends so that the full weight of the arm is not applied as the saw cuts through the workpiece. In some saws, however, the cylinder will add to the weight of the arm to produce the desired cutting force and feed rate.

In most band saw apparatus feed cylinder 38 includes a flow control valve means (not shown in FIG. 1, but shown at 185 in FIG. 9), which enables selective control of the rate at which a working fluid can escape from cylinder 38 to thus control the rate at which arm or carriage means 22 descends toward the workpiece. Moreover, it is usually possible to effectively disengage the feeding function of the feed cylinder so that the working fluid is not significantly restrained in its passage between the cylinder and a storage reservoir or atmosphere. There will be some resistance to fluid flow inherent in the system when the flow control valve is bypassed to "disengage" feed cylinder 38, but movement of the piston within cylinder 38, as used herein, shall be deemed to be "substantially unconstrained" when the working fluid affords little or negligible resistance to arm movement.

As will be appreciated. it also is possible to mechanically disengage cylinder 38 from arm or carriage 22 so that carriage movement is solely determined by gravity. Such mechanically disengaged feed cylinder also shall be deemed to be "substantially disengaged" as used herein. Moreover, it will be understood that for vertically movable saw carriages gravity will resist any upward movement of carriage 22, whether mechanically disengaged or disengaged by opening or effectively taking the flow control valve of cylinder 38 out of the system. Still further, for horizontally displaceable carriages some return energy means, a spring or pressure source, is required to maintain the saw carriage biased toward the work.

For purposes of simplicity of illustration, the saw of FIG. 1 has the wheel housings removed. Additionally, it will be understood that guide assemblies 33 and 34 are carried by arm 22, and the guide assemblies twist blade 29 from its horizontal orientation on the drive and idler wheels to substantially a vertical orientation across cutting stretch 32.

As thus far described, the band saw apparatus is well known in the prior art, and vertical band saws, for example as shown in my U.S, Pat. No. 4,117,756, and horizontal band saws include functionally equivalent structure.

Band saw 21 further includes displacement or reciprocation means 41 formed and mounted to reciprocate blade 29 toward and away from the workpiece during cutting of the same. Broadly, blade displacement means are known in the prior art and not regarded as a novel portion of the present invention. Saw blades, for example, having a varying height dimension which pass over fixed rollers effect displacement of the blade teeth relative to the workpiece alteratively, the saw of U.S. Pat. No. 4,127,045 employs a single reciprocation means which is mounted to a blade guide that is separated from the workpiece being cut by a significant distance (as shown in the drawing, about one diameter of the workpiece). Displacing the back edge of the saw blade at a single location will effect see-sawing, but the effect is minimized by bending or bowing of the blade between the guide and the workpiece. Hydraulic cylinder 52 constrains the arm in the saw of U.S. Pat. No. 4,127,045 against reaction, and the saw blade therefore flexes. This structure produces limited see-sawing on the entrance side of the cut, but the exit side experiences only a slight effect from bowing of the blade.

Additionally, the single point displacement system of U.S. Pat. No. 4,127,045 also limits the ability to superimpose independent and varying frequencies and amplitudes of displacement at both sides of the cut to achieve an optimum or tuned vibration pattern for the particular material and shape being cut.

In the improved band saw apparatus of the present invention reciprocation means 41 is provided by two relatively spaced-apart blade support assemblies each of which is formed and mounted for reciprocation toward and away from the workpiece to enable variation of the angle of the cutting edge of the blade to increase the cutting force per unit area of the localized pressure of the blade against the workpiece.

Figure 2:
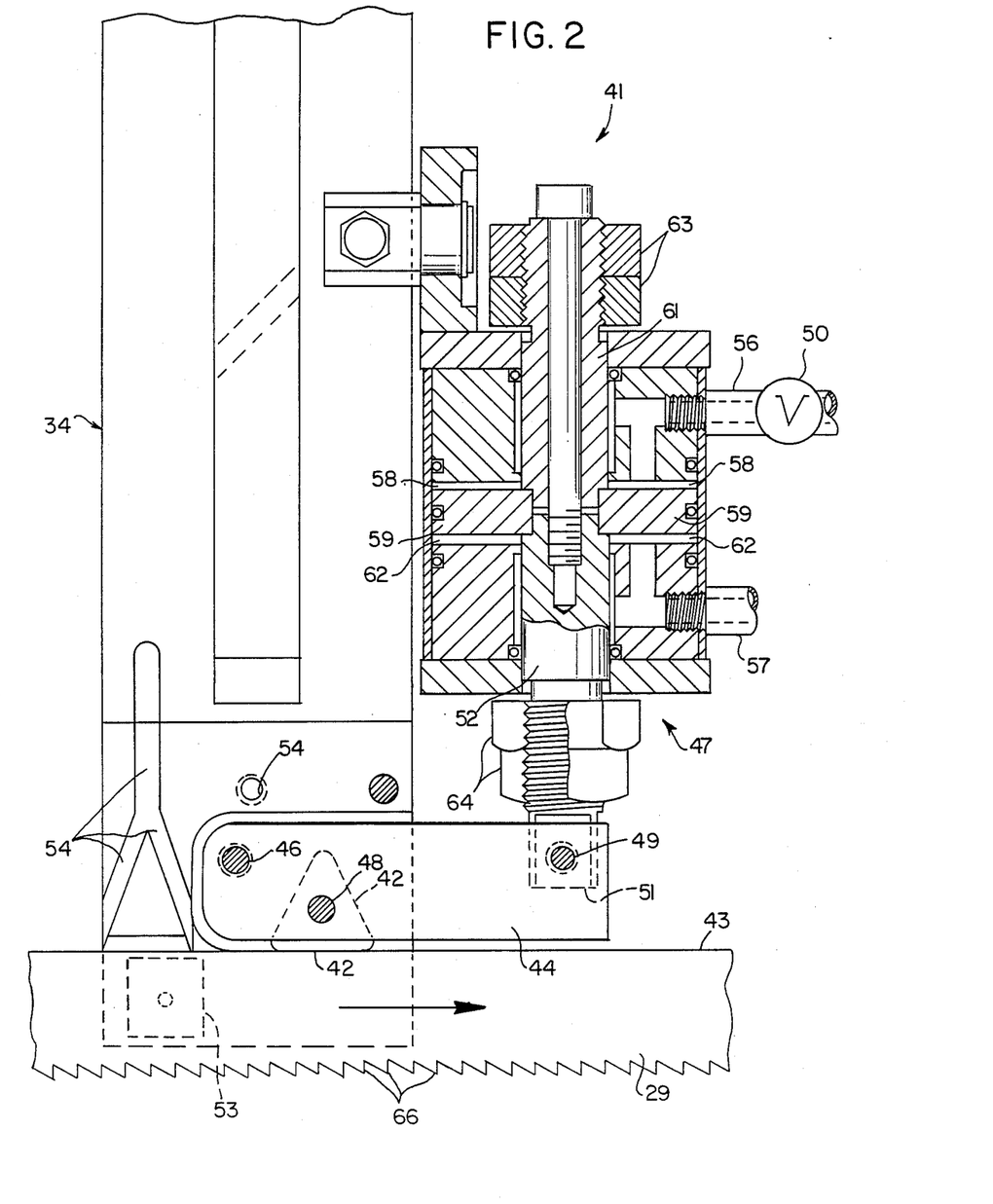
FIG. 2 is an enlarged, fragmentary, cross-sectional view of the area bounded by line 2—2 in FIG 1 showing blade displacement apparatus constructed in accordance with the present invention.

As best may be seen in FIG. 2, reciprocation means 41 on each blade support assembly preferably includes a blade support or guide block 42 mounted for enagement with the back edge 43 of saw blade 29. Blade support means 42 further includes lever means 44 pivotally mounted at 46 to an end of guide assembly 34. Coupled to an opposite end of lever means 44 is a double-acting spool valve or piston and cylinder, generally designated 47, which may be pneumatically or hydraulically actuated. It is preferable that blade guide block 42 be pivoted to lever 44 at 48, and that lever 44 actually be formed as a pair of lever arms on either side of the central guide block. The pair of arms can be pivoted at 49 to the end 51 of movable piston element 52.

Figure 3:
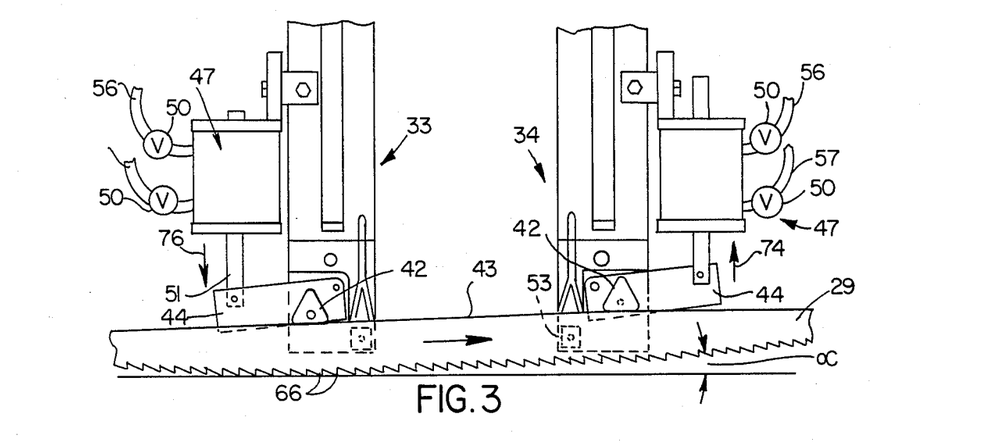
FIGS. 3, 4 and 5 are fragmentary, side elevational views of band saw guide assemblies constructed in accordance with the present invention with the blade displaced upwardly on the righthand side of the displacement apparatus, both guides in a neutral position, blade displaced upwardly on the lefthand side of apparatus, respectively.
Figure 4:
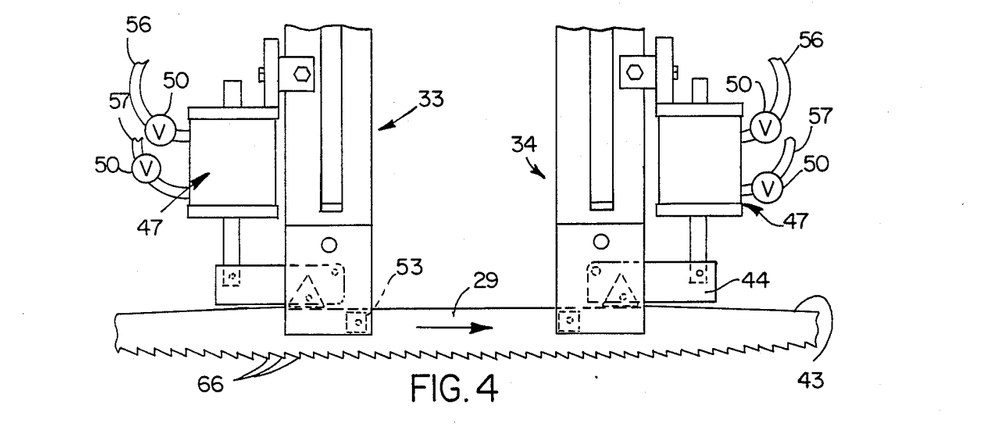
Figure 5:
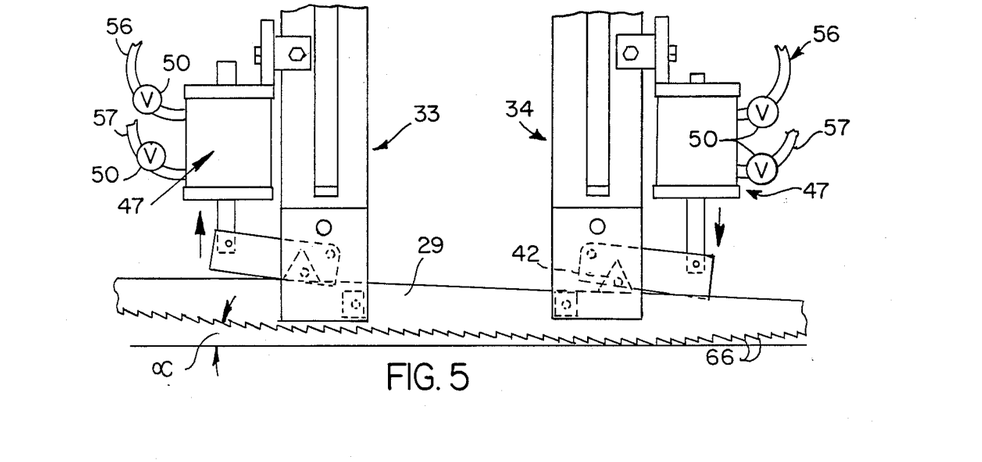

In order to twist the blade into a vertical orientation, it is preferable that guide assemblies further include a pair of guide blocks 53 which engage the sides of blade 29. As shown in FIG. 2, only one block 53 is visible, but it will be understood that a second half of the lower guide assembly carrying a similar block 53 is attached to the end of the guide by a fastener mounted into threaded bore 54. FIG. 3 corresponds to FIG. 2 in that the outside halves of the guide assemblies have been removed, but FIGS. 4 and 5 show the assemblies with the other half of the ends of the guides secured in place so that a carbide guide block 53 engages each side of blade 29, in a manner well known in the art. The guide assemblies also preferably include coolant channels 15 for the discharge of fluid coolant down on the back edge 43 and sides of the blade.

Fluid piston-cylinder assembly 47 is operated by communicating fluid through one of lines 56 and 57, for purposes of illustration through line 56, to cylinder 58. In order to control the flow of fluid to cylinder 58, it is preferable that flow control valve 50 be positioned in one or both of lines 56 and 57. Valve 50 can be formed for controlled flow in one direction and free flow in the opposite direction or for controlled flow in both directions. The flow of fluid into cylinder 58 causes washer or flange 59 mounted on central longitudinally extending shaft 61 to be downwardly displaced, for example, by a distance of 0.180 inches (4.5 millimeters), which in turn causes backup guide 42 to move 0.060 inches (1.5 millimeters). When fluid is supplied in line 57 and allowed to escape through line 56 past valve 50, cylinder 62 receives fluid, and the flange and shaft are upwardly displaced. The rate that the fluid volume enters or leaves cylinder 58 can be controlled by valve 50 so as to control the speed of displacement and the duration of dwells, for example, at maximum displacement.

Lock nuts 63 and 64 can be used to easily vary the amplitude of displacement. It will be seen that displacement need not be very great in order to generate a substantial displacement at cutting edge 66 of the blade. As will be readily understood, the vertical displacement of the end 51 of shaft 61 is transmitted by lever 44 to guide block or blade enaging support 42. This in turn causes displacement of the edge 43 of the blade and a downward displacement and a slight localized increase in pressure of the cutting edge or teeth 66 against the workpiece.

In addition to displacement of the saw blade at two spaced-apart locations along the length thereof to maximize the see-sawing effect, it is a further very important feature of the apparatus and method of the present invention that the saw arm or carriage 22 is free or substantially unconstrained so that it can move toward and away from the workpiece during blade displacement. In order to minimize lateral deviation of the saw blade, guides 33 and 34 should be positioned as close to workpiece 81 as possible. Such positioning of the blade guides essentially eliminates (minimizes) the flexure of blade 29 during displacement and/or see-sawing. In order to prevent digging in of the blade while still maintaining substantial vertical displacement, the fluid control valve in fluid feed cylinder 38 is disengaged (in the "off" condition by bypassing the valve as is explained in detail in connection with FIG. 9) so that descent of the arm is controlled solely by gravity (in vertically movable saws) and the nominal resistance to fluid flow inherent in the cylinder hydraulic or pneumatic system.

The result of freeing arm 22 from the constraint of feed cylinder 38 is that displacement of the blade by assemblies 41 urges the teeth into the workpiece beyond the initial set required to pull a chip and until the teeth start to dig in and stall the saw. As the teeth start to dig in, the resistance increases rapidly and forces arm 22 upwardly, even though displacement assemblies 41 are urging the blade downwardly. The downward displacement of assemblies 41 essentially causes the teeth to penetrate the workpiece until the point of digging in is about to occur, at which point further downward displacement is converted to upward displacement of arm 22 against gravity. Disconnecting feed cylinder 38 effectively permits the arm to automatically move away from the workpiece or rebound just before digging in when the substantial increase in load occurs.

Moreover, freeing the arm to move without the constraint of the feed cylinder and associated control circuit allows the arm to rapidly move back toward the workpiece to maintain the cutting force on the workpiece when the saw blade is displaced away from the workpiece. Thus, the cutting force is maintained at a substantially constant level throughout a longer portion of the reciprocation or blade displacement cycle. The result is maintenance of the cutting force at a more constant level closer to but below the level producing digging in and stalling of the saw for substantially the entire displacement cycle. This substantially enhances cutting efficiency.

As will be apparent, the inertia of the arm affects rebound, as will the area of the workpiece being engaged and the hardness of the workpiece. The area of the workpiece being engaged will also be effected by the amount of see-sawing (reduction of area) which is occuring and the width dimension of the workpiece. For most commercially available band saws, however, the inertia of the saw arm or movable frame or carriage will not be so great as to prevent movement of the arm away before digging in of the teeth.

Accordingly, for a given arm inertia and spaced-apart displacement assemblies, the operator can tune amplitude, frequency, displacement speed and duration of any dwells in the displacement of the saw blade to cause the teeth to penetrate the material up to a maximum short of digging in, or for very hard materials up to a maximum for the inertia of the arm. The latter condition occurs when the arm is very light or has a low inertia and it is not possible to penetrate the teeth into the workpiece to a degree approaching the dig in (stall or shear) point. Most commercially available saws will have sufficient inertia to cause the saw teeth to approach the dig in point and back the arm up to release the blade short of dig in once the amplitude, frequency and speed of displacement have been tuned to the saws physical characteristics.

In the preferred form pivot 23 provides means coupling arm or frame 22 to the remainder of the saw for advancement of the saw blade through the workpiece (or through the portion of the workpiece being cut if the piece is not to be cut completely through). When cylinder 38 is disengaged, pivot means 23 for coupling the blade for advancement is also coupled for free or substantially unconstrained movement (pivoting) toward or away from the workpiece in response to relative displacement of the saw blade away from and toward the workpiece. This enables guide assemblies 41 to be positioned as closely proximate opposite sides of the workpiece as can be accomplished while still cutting to the desired depth in the workpiece.

As will be more fully described in connection with FIG. 9, the width dimension of many workpieces will vary with the depth of cut. Most typical of such workpieces is cylindrical bar stock. The effect of such width variations is to change the area (length along the blade) being engaged by the saw blade. When the area is changing with the depth of cut, the autoxatic releasing feature which results from disengaging the feed means for the saw so that the carriage can rebound or react away from the blade to avoid dig in and move toward the blade to maintain the cutting force or pressure is very important.

As the length of blade engagement with the workpiece decreases, the force per unit area increases for a given blade displacement. But, as digging in of the teeth and stalling of the saw is approached, the carriage moves away in reaction to the rapidly increasing resistance. For narrow sections of the workpiece this reaction away starts somewhat sooner as the smaller area tends to result in digging in at an earlier stage. As the section or width of the workpiece increases it takes more displacement of the saw blade to reach the dig in point, and reaction away occurs later in the displacement cycle. Freeing the saw from its controlled displaceent rate, however, allows automatic rebound before digging in even though the width of the work is varying with the cut. The feed rate and the displacement amplitude need not be set for the worst (smallest area) condition in order to avoid dig in; instead the feed is disengaged and amplitude of displacement optimized with other operating conditions (e.q., blade speed) to produce optimum cutting.

Displacement of blade 29 by a pair of spaced-apart blade guiding assemblies has several important advantages over a single point displacement assembly of the type disclosed in U.S. Pat. No. 4,127,045. First, as will be described in more detail hereinafter, it enables very substantial changes in the angle at which the workpiece is contacted during cutting. Instead of pivoting around arm pivot point 23 or flexing about one side of the workpiece, the two displacement assemblies 41 can be run out of synchronism so as to tilt, rock or see-saw the blade with respect to arm or drive wheel frame 22 through angles which are much greater than can be accomplished by a single point displacement device for the same amplitude of displacement. As the area engaged by the teeth decreases, the ability of the teeth to approach maximum penetration short of digging in is enhanced.

Second, each of the reciprocation assemblies 41 can be independently operated. Thus, it is possible to superimpose different displacement frequencies and amplitudes on top of each other, as well as operating the displacement assemblies in synchronism. This allows the user to tune or adjust displacement patterns until the optimum for a particular workpiece and saw arm inertia is achieved.

Additionally, variation or increase and decrease in the area being cut by cutting edge 66 can be accomplished at a frequency which is totally independent of the shape or configuration of blade 29. Moreover, the amplitude and rate or speed of displacement is also totally independent of the shape or configuration of blade 29. Still further, it is possible to vary the length of time or duration at which the blade dwells at any of various cutting angles with respect to the workpiece.

The independent variation of frequency, amplitude, speed of displacement and duration of the displacement at two locations along the blade, when using the apparatus of the present invention, has other important advantages. First, the band saw blade can be any standard or conventional blade. Since there are many different types of band saw blades (e.o. Raker set, wavy set, standard tooth, hook tooth, skip tooth, and various tooth rakes) one can achieve the benefits of blade vibration with virtually any blade. Additionally, the ability to vary frequency, amplitude, speed of displacement and duration minimizes blade wear since the cutting force and large chip load will be more evenly distributed over the length of the blade.

Pneumatic and hydraulic valves 50 and controllers are known in the art which are capable of attachment to fluid piston-cylinder assembly 47 to produce and vary the frequency of fluid pulses to either side of the spool or flange 59. In the preferred form, such controllers can be computer assisted with measurement apparatus (shown in FIG. 9). FIG. 9 shows a hinge-top or pivotal arm saw with an angular transducer 136, but in a vertical or horizontal saw a linear transducer would be employed. The main requirement is to measure or sense the position of the saw blade into the material, and then the controller would set the cutting rate for optimization of frequency, duration and blade speed, all of which can be independently altered. In the apparatus shown in the drawing, amplitude is controlled by the lock nuts 63 and 64 and can be manually altered, but it will be understood that more elaborate apparatus for automatic controlled variation of amplitude can also be incorporated into the fluid piston-cylinder assembly 47.

Figure 2A:
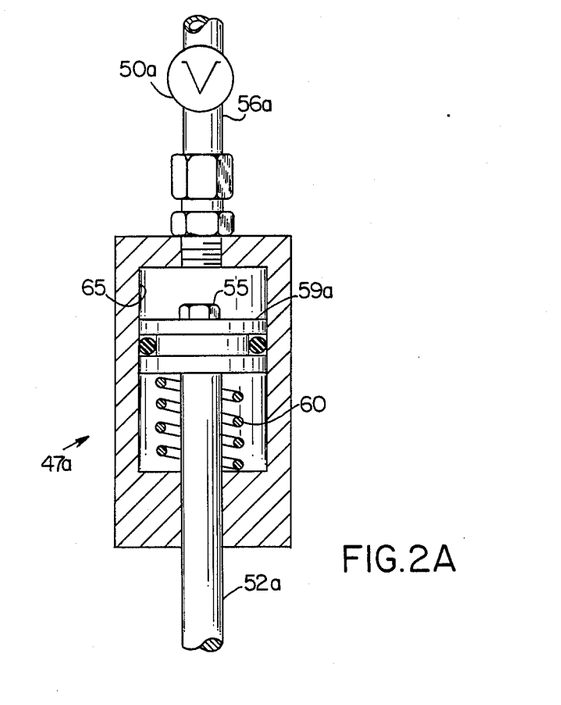
FIG. 2A is a fragmentary, side elevational view, in cross section of an alternative embodiment of the fluid cylinder of FIG. 2.

An alternate emdobiment of fluid piston and cylinder assembly 47 is shown in FIG. 2A. Coupled directly to a guide block (not shown), or indirectly through a lever arm (not shown), is piston rod 52a which is connected by fastener 55 to piston 59a. In order to produce a reciprocal motion, piston 59a is biased by spring biasing means 60 in a direction opposed to displacement produced by introducing fluid into cylinder 65 through fluid conduit 56a and control valve 50a. Again, fluid piston-cylinder assembly 47a enables variation of the frequency, amplitude, speed and duration of the displacement of the blade against the workpiece by controlling the fluid flow to cylinder 65 and piston 59a, against which spring 60 works.

In the preferred form of the invention the mechanical reciprocation of band saw blade 29 is accomplished by blade support means mounted to a pair of blade guide assemblies of the band saw. Reciprocation of blade support means also can be accomplished, however, by displacing the entire arm 22 toward and away from the workpiece, either alone or in combination with reciprocation at the guide assemblies. Thus, arm displacement means, generally designated 71, may be coupled to arm 22 for reciprocation of the arm toward and away from the workpiece to enable variation of the displacement of the cutting edge of the blade during advancement across the workpiece. In the preferred form of this embodiment, a fluid piston cylinder assembly 72 can be mounted in series with lift cylinder 38. Fluid piston-cylinder 72 can be constructed substantially as shown in connection with piston-cylinder assembly 47 and coupled by conduit means 73 to a controller.

Disengaging feed cylinder 38 still frees the arm to rebound or move toward and away from the workpiece as necessary to avoid dig in of the teeth even though cylinder 71 is used to displace the arm. Alternatively, displacement means 71 can be provided with means, such as a relief valve, for releasing or terminating downward pressure in the event that resistance from digging in of the teeth starts to increase dramatically, or a balance cylinder can be coupled to the arm in parallel to cylinder 38, as shown in FIG. 9.

The use of arm displacement means 71 to effect mechanical vibration of the saw blade also allows a variation of the frequency, amplitude, speed and duration of the vertical stroke of the blade independently of the speed of advancement of the saw blade.

The improved cutting method of the present invention and the variations in cutting force per unit area which can be achieved through the method and apparatus of the present invention are best described in detail by reference to FIGS. 3 through 5. One of the advantages of vibrating or reciprocating blade support members 42 for the saw blade is that two spaced apart blade support members on the spaced-apart guide assemblies 41 can be used to see-saw or oscillate the blade, as well as vertically reciprocate the same.

Oscillation of the blade can be accomplished by operating the two stroke cylinders 47 out of phase. Thus, as shown in FIG. 3, the righthand lift cylinder and lever 44 are in an up position, as shown by arrow 74, while the lefthand piston cylinder assembly 47 is in the down position, as shown by arrow 76. The downward displacement of the left side and upward displacement of the right side causes the blade to lift upwardly by an angle α.

In FIG. 4, both stroke cylinders 47 are in a neutral position, which can be an intermediate position between the orientation of FIGS. 3 and 5 or illustrative of mid stroke when the two stroke cylinders are reciprocated in synchronism. Finally, in FIG. 5, the positions of the cylinders of FIG. 3 has been reversed with the result that the angle α is now produced as an opposite or mirror image of that produced in FIG. 3.

As will be seen from FIGS. 3–5, therefore, the cutting stretch of blade 29 tilts with respect to arm or drive wheel frame 22 about a center of tilting located between blade support assemblies 33 and 34. Moreover, in FIG. 7 such blade tilting preferably shall be seen to occur proximate the center of the transverse or width dimension of workpiece 81. Such tilting of blade 29 about the center of workpiece 81 minimizes the reaction displacement or bouncing of arm 22 for a given angular displacement of the blade.

As will be understood, operation of cylinders 47 can be synchronized out of phase so as to produce a constant oscillation of blade 29. In addition to oscillating the blade, various complex reciprocation modes can be employed. It is possible, for example, to operate one of stroke cylinders 47 at twice the frequency of the other so that there are various in-phase and out-of-phase displacements. It is also possible to hold one of the cylinders in a neutral position while the other is displaced down and then up, and thereafter to hold the reciprocating one and displace the first one which was held through a stroke. To enhance control the apparatus is shown with flow control valves 50 in both lines 56 and 57.

Thus, it is a very important feature of the present invention that the mechanical reciprocation of the band saw blade can be accomplished at at least two distinct, spaced apart locations along the length of the blade so as to enable oscillation, reciprocation and combinations thereof. Using a computer to run the pneumatic controller, it is readily possible to program very complex blade reciprocation patterns so as to produce optimum cutting efficiency.

Figure 6:
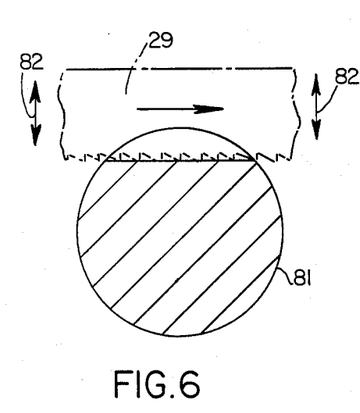
FIGS. 6, 7 and 8 are enlarged, cross-sectional views through a workpiece illustrating the method of cutting a round workpiece of the present invention.
Figure 7:
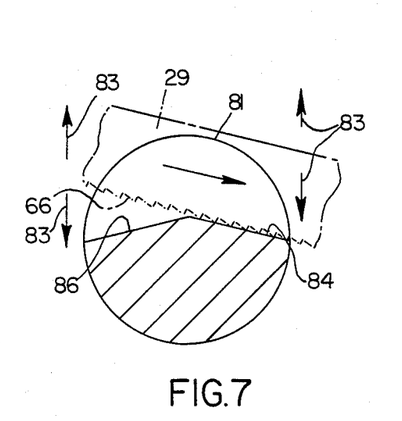
Figure 8:
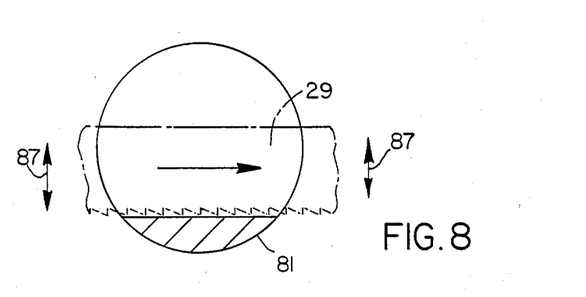

An illustration of the method of the present invention and the advantages of the apparatus of the present invention can best be understood by reference to FIGS. 6, 7 and 8. As will be seen, a piece of round stock or workpiece 81 of varying width is being cut by blade 29 using the apparatus of the present invention. In order to enhance the efficiency over the depth of cut, it is preferable to change the blade displacement mode as a function of the width being cut. In FIG. 6, blade 29 is generally horizontally oriented. and the stroke cylinders are being operated in synchronism for essentially vertical displacement, as indicated by arrows 82. Such vertical reciprocation is continued until blade 29 has cut through approximately 10 to 20%, and preferably 15%, of the diameter of workpiece 81. Thus, when the width and area of the workpiece are relatively small, see-sawing action is not required. Once the saw has cut through about 15% of the diameter, the stroke cylinders 47 are operated so as to cause oscillation of blade 29, as indicated by arrows 83. This oscillation of the cutting stretch about the workpiece results in a cut in which there are two beveled surfaces 84 and 86 meeting proximate the transverse center of the workpiece against which the cutting edge 66 is alternately cutting. The angles of these surfaces are exaggerated in FIG. 7 for the purpose of illustration, and they would normally be equal to the angle α from the horizontal count as shown in FIGS. 3 and 5 or 2 α between cutting edge 66 and surface 86. The cutting is continued in an oscillation mode until approximately 80 to 90% of the diameter has been cut, at which point the area of the workpiece is again small and the cylinders are operated in synchronism again, as shown in FIG. 8 and indicated by arrows 87.

As will be seen from FIG. 7, the advantage of oscillating is to reduce the length of surface being cut at any one time during oscillation. When round stock is being cut the effective cross section width can be reduced by oscillation in the center of the cut. The outside edges of round stock tend to have a lesser cross section in any event and oscillation is not required. For square bar stock, it is advantageous to start the cut without oscillating until the cut is established then oscillate the blade through the substantially entire cut as a way of reducing the length of the blade in contact with the workpiece during the cut. The cut is completed without blade displacement (oscillation or reciprocation) to avoid a sudden break through of the thin section, digging in of the teeth, and stalling of the saw (the last 5 percent or less).

Referring to FIGS. 3, 4 and 5, it will be apparent that a wavy back blade (U.S. Pat. No. 4,195,543) can be used to produce oscillation by simply allowing the blade displacement piston-cylinder assemblies to be passive (unpowered) or follow the back of the blade. Thus, if the piston-cylinder assemblies 47 are connected together as a closed circuit with conduits 56 coupled together and conduits 57 coupled together (not shown) and valves 50 opened, the blade will have no vertical motion, or will reciprocate, or will see-saw (oscillate), depending upon the distance between the wave peaks. If the guides are spaced at one-half the blade phase, no vertical displacement occurs. At a distance equal to the blade phase vertical displacement is produced, and at distances other than one-half or one blade phase, see-sawing results. Thus, the apparatus of the present invention can be used with conventional blades by employing powered blade displacement or with variable height blades and employing unpowered displacement.

Figure 5A:
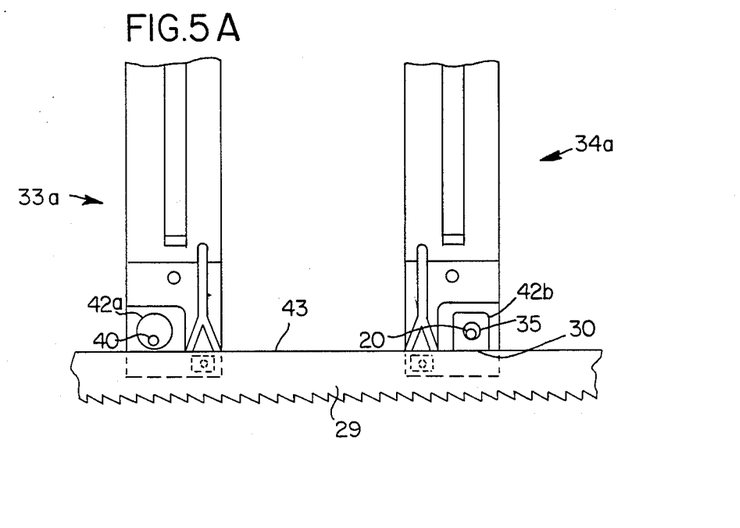
FIG. 5A is a fragmentary, side elevational view of an alternative embodiment of band saw guide assemblies constructed in accordance with the present invention.

Further alternative embodiments of the present invention are illustrated in FIG. 5A. Guide assembly 33a is provided with an eccentrically mounted cylindrical guide element or block 42a which is formed for rolling engagement with back edge 43 of blade 29. Advancement of blade 29 produces rotation of block 42a about a shaft 40, which is eccentric to the surface of the block and which cause vertical displacement of the saw blade.

Guide assembly 34a includes a guide element 42b which has a planar blade engaging surface 30 formed for sliding engagement with back edge 43 of the blade. In order to provide for reciprocation of blade 29, guide element 42b includes an eccentrically mounted element 35 formed for rotation about and driving by shaft 20. A rotary motor (not shown) drives shaft 20.

Each of guide assemblies 33a and 34a, therefore, can be used in pairs of similarly formed assemblies and in various combinations with other blade displacing assemblies.

Figure 9:
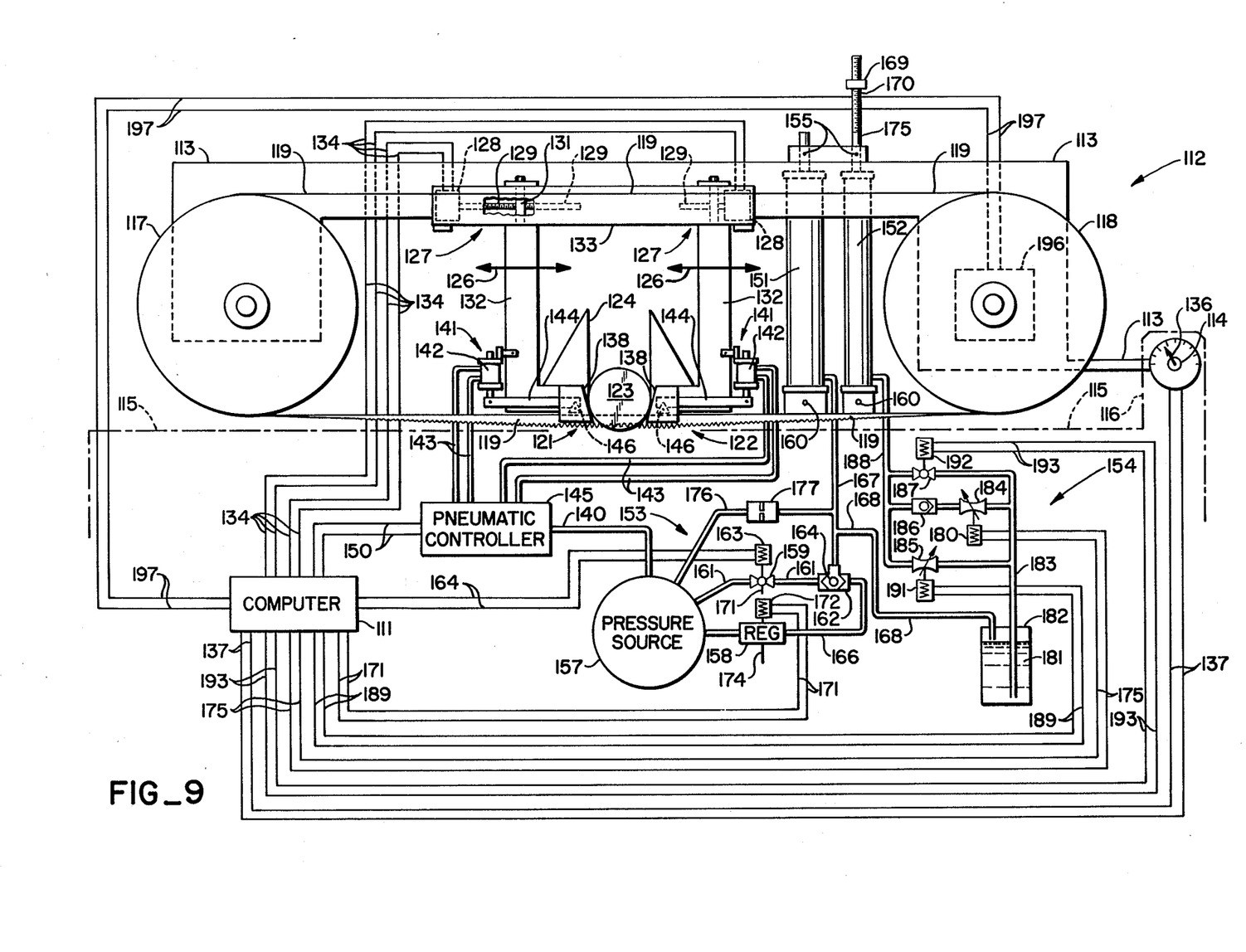
FIG. 9 is a side elevational view and schematic diagram corresponding to FIG. 1 of an alternative embodiment of the present invention.

An alternative embodiment of the band saw apparatus of the present invention is shown in FIG. 9. Saw 112 is coupled to computer 113, which is preferably a general purpose digital computer, to permit variation and optimum control of various operating parameters of the saw. As shown for the saw apparatus of FIG. 1, saw 112 includes arm 113 pivotally mounted at 114 to saw base 115, and particularly arm support structure 116. Carried by arm 113 are a pair of wheels 117 and 118 upon which saw blade 119 is mounted, and the pivotally mounted arm thereby provides a movable carriage means which can be displaced toward or away from workpiece 123 by fluid piston-cylinder assemblies 151 and 152 as will be described more fully below.

In order to guide saw blade 119 as it cuts workpiece 123, the saw further includes a pair of laterally movable guide assemblies 121 and 122 which are mounted to arm 113 by a track or guideway 133. Although it is possible to provide one of guide assemblies 121 and 122 as a fixed assembly, it is most preferable that both assemblies are mounted for displacement along guideway 133 as indicated by arrows 126.

As thus far described saw 112 is constructed in a manner well known in the art. The importance of maintaining the saw blade guide assemblies as close to workpiece 123 as possible in order to avoid blade wandering also is well known. As above set forth, displacement of the band saw blade has often been accommodated by maintaining the guides at a spaced distance from the workpiece to allow blade flexure with an attendant loss in cutting accuracy. The method and apparatus of the present invention permit blade displacement while the guides are in close proximity to the workpiece by allowing the arm or carriage assembly to rebound. Accordingly, enhanced cutting efficiency can be accomplished without sacrificing accuracy.

In order to further enhance the accuracy of band saw cutting, saw 112 is formed for displacement of at least one of guide assemblies 121 and 122 toward and away from workpiece 123 during cutting. Thus, guide assembly displacement means are provided for displacing one or both of guides 121 and 122 relative to workpiece 123, which is held by vise 124. In the preferred form guide displacement means 127 include motors 128 coupled to drive lead screws 129 which pass through a threaded bore in members 131. The threaded members 131 are movably mounted with respect to guideway 133 and are coupled to guide arms 132. When actuated and controlled by computer 111, motors 128 can be used to position the guide assemblies in substantially abutting relation to workpiece 123.

Since workpiece 123 can vary in its width dimension over the depth of cut, it is an important feature of the band saw apparatus that guides 121 and 122 can also vary in the width of their spacing over the depth of the cut to better conform to the width of the workpiece and thereby improve cutting accuracy. Computer 111 can be fed a signal from sensing means so as to know the position of blade 119 relative to material 123, and in that way the position of guide assemblies 121 and 122 could be laterally adjusted by computer commands to motors 128 for displacement of guide arms 132.

Several methods of varying the positioning of guide assemblies 121 and 122 to conform to the width of workpiece 123 may be used. In a completely automated move the saw operator would input to the computer the bar stock cross-sectional configuration and nominal dimensions. Alternatively, sensing means and feedback to computer 111 can be employed, for example by sensors which determine the position of vise 124 when it grips workpiece 123. Standard tracing methods including sensors or a stylist mounted to the guide arms which engage and follow irregular or varying workpiece shapes can be employed and fed back to computer 111.

As shown in FIG. 9, input siqnals from an angular transducer 136 is fed back to computer 111 by conductors 137. For vertical or horizontal saws a linear sensor or transducer would be substituted for angular transducer 136. As arm 113 pivots, computer receives input as to the depth of the blade in the cut. If input is also given that the workpiece is cylindrical bar stock, for example, computer 111 can drive motors 128 through conductors 134 to position the guides next to workpiece 123 over the full depth of cut. Alternatively or additionally, a cam and follower assembly (not shown) can be positioned at pivot 114, with the cam having a surface which is angularly correlated to the width dimension at various depths of cut for the workpiece.

Thus, sensing at pivot 114 or directly off the workpiece can be used to control and vary the width of guide assembly space during cutting. It is most preferable that guide assembly ends be relieved at 138 or relatively small in height dimension to facilitate closer positioning of the guide assemblies to workpiece 123 in the undercut areas, such as the lower half of the cylinder. As will also be seen from FIG. 9, the lefthand lead screw 128 is longer than the righthand lead screw. This structure is used because the lefthand jaw of vise 124 is usually adjustable while the righthand jaw is fixed. Lefthand lead screw, therefore, accommodates the major adjustments necessary for workpieces of various widths, while both sides need only be adjusted to a more minor degree to accommodate variation in the workpiece width as a function of depth.

As will be apparent the advantages of increased accuracy are achieved by adjustment of the guide settings as a function of workpiece width for saws which do not include blade displacement means 141, but in combination with the blade displacement means 141 both improved cutting rates and improved cutting accuracy can be achieved by moving guide assemblies 124 and 122 during cutting to maintain them as closely adjacent to workpiece 123 as possible throughout the cut.

As shown in FIG. 9, blade displacement means 141 are provided by piston-cylinder assemblies 143 to a fluid controller, in this case pneumatic controller 145, which is connected by conduit 140 to pressure source 157. Blade displacement is accomplished by levers 144 upon which guide blocks 146 are mounted and formed to enage the back edge of blade 119, as described in detail in connection with FIG. 2.

In order to enable variation of the displacement of blade 119 in combination with variation of other saw operating conditions, pneumatic controller 145 is coupled for control by conductors 150 to computer 111.

The feed and cutting force control means of saw 112 is provided by a pair of fluid piston-cylinders assemblies 151 and 152, which are coupled to fluid control circuits 153 and 154, respectively. The piston-cylinder assemblies are pinned to arm 113 by pins 155 and to base 115 by pins 160 so that forces can be applied between the base and arm to lift the arm and control its descent.

Piston and cylinder assembly 151 and control circuit 153 are used to lift the saw arm and to apply a cutting force to arm 113 and thus blade 119. Piston-cylinder assembly 151 is coupled between saw support or base 115 and arm 113, and assembly 151 either supports the arm with respect to the base or pulls the arm toward the base to achieve the desired cutting pressure.

The pneumatic control circuit 153 preferably includes a branch in which conduit 161 from pressure source 157 has mounted therein a three-way lift valve 159 and a two-way check valve 162. Upon opening of valve 159 by solenoid 163 upon command from computer 111 through conductors 164, the high pressure in conduit 161 drives the ball 164 in valve 162 to the right seat and closes conduit 166 for the pressurization of conduit 167, conduit 168 and piston-cylinder assembly 151. High pressure in piston-cylinder 151 raises arm 113 until the arm is stopped by adjustable stop means 169. Note that stop means 169 is mounted on a rod 170 behind the piston rod 175 of piston-cylinder 152. As will be appreciated, limits switches (not shown) and/or angular transducer 136 can be used to signal the computer to stop lifting of arm 113.

When the valve 159 shifts by solenoid 163, the pressure source 157 is blocked, and that allows the pressure in lines 167 and 168 to flow back and leak to atmosphere out of release or bleed orifice 171 in valve 159. Mounted in conduit 166 is a relieving regulator 158 which can be set to relieve pressure in conduit 166 by a valve actuator 172 coupled by electrical conductors 173 to computer 111. When the pressure drops in 167 and 168 below the pressure set in line 166 set by regulator 158, then the ball 164 moves to the opposite side, and relieving regulator 158 controls the pneumatic circuit.

In the example shown in FIG. 9, the weight of the arm is greater than the downward force desired to be applied to blade 119. Control circuit 153 and particularly relieving regulator 158 is set so that the net of the pressure in line 166 and the weight of the arm equals the downward cutting force applied to and through blade 119. Without more, arm 113 will descend slightly until relieving regulator 158 has discharged gas through outlet 174 and the weight of arm 113 is supported by the combination of the pressure in conduit 166 as determined by regulator 158 and the predetermined force of workpiece 123 against blade 119.

In order to enhance the accuracy of adjustment and sensitivity of relieving regulator 158, it is preferable to provide control circuit 153 with a conduit 176 having orifice means 177 mounted therein with conduit 176 being coupled to pressure source 157 and conduit 167. Orifice means 177 is a very small diameter orifice, e.g. 0.004 inches, in order to constantly leak pressure into conduit 167 which will be "seen" by relieving regulator 158 when check valve ball 164 moves to the left and opens conduit 166. It is well known in the pneumatic art that the leak provided by orifice 177 into the relieving regulator will cause constant functioning of the regulator and thereby prevent sticking or delays and inconsistancy in the pressure relieving function. This portion of circuit 153 is not regarded as containing any novelty.

While piston-cylinder assembly 151 and control circuit 153 provide control of the downward cutting force applied by blade 119, piston-cylinder assembly 152 and control circuit 154 provide for control of the advancement of the arm and blade down through the workpiece.

As will be seen from FIG. 9, it is preferable that fluid circuit 154 be provided as a liquid control circuit most preferably employing oil 181 as the working fluid. Fluid reservoir 182 is connected by conduit 183 to four valves 184, 185, 186 and 187 and in turn through conduit 188 to piston-cylinder assembly 152. Since circuit 154 is a closed circuit, when piston-cylinder 151 is used to lift or raise arm 113 and if valve 184 is open, fluid is drawn from reservoir 182 through valve 184 and past check valve 186 and into cylinder 151 by suction. Computer 111 is coupled by conductors 189 to valve actuator 191 for variable or adjustable valve 185 and by conductors 175 to valve actuator 180 for variation of the flow through valve 184. As the arm descends, check valve 186 shuts and the working fluid returns to reservoir 182 through variable valve 185, which has been set by the computer to control the return of fluid to the reservoir at a predetermined rate. The computer can also shut off the flow of fluid through valve 185 and stop the descent of the saw arm.

While fluid circuit 153 limits the weight or force which can be applied to the blade, circuit 154 controls the rate of descent of the arm and blade.

In order to enhance lifting of the arm and insure flow of liquid to piston-cylinder assembly 152, it is further preferable to provide reservoir 182 as a pressure vessel and couple penumatic conduit 168 to reservoir 182. During the lifting of arm 113 by pressurization of conduit 167, pressure through conduit 168 on reservoir 182 forces oil up into the cylinder of assembly 152. This pressurized flow of oil to assembly 152 adds to the lifting force on the arm and more positively insures that oil will fill the cylinder than is the case when suction is the only mechanism employed.

As above set forth, it is an important feature of the present invention to be able to disengage or essentially uncouple the feed portion of the saw when blade 119 is being displaced or reciprocated by displacement means 141. Such disengagement frees the arm to rebound toward and away from the workpiece as needed to enable the a high, substantially constant, cutting force, as determined by cylinder 151 and circuit 153, to be maintained throughout the cutting cycle. In the fluid control circuit 154 of FIG. 9 this is accomplished by providing valve 187 which can essentially dump to reservoir 182.

Solenoid valve operator 192 is coupled to computer 111 by electrical conductors 193 to enable valve 187 to be selectively opened or closed by the computer. In the closed position fluid flows from cylinder 152 through variable opening valve 185 as the arm descends. With valve 184 wide open check valve 186 will permit rapid movement of arm 113 away from the workpiece when the arm tries to move upwardly away from workpiece 123 in response to displacement of the blade toward the workpiece. When valve 187 is opened, however, the fluid bypasses variable valves 185 and 184 and check valve 186. This allows the arm and saw blade to maintain the cutting force of cylinder 151 when the blade displacement means 141 moves the blade away from the material being cut. The fluid in circuit 154 is essentially free to move between the reservoir and the cylinder as required by the dynamics of vibrating the saw blade. Throughout this process relieving regulator 158 will maintain the pre-set cutting force. Only the arm descent control will be disengaged.

It should be noted that when conduit 168 is coupled to reservoir 182 the pressure in circuit 154 is also communicated back to circuit 153 so that a different regulator setting is employed because both piston-cylinder assemblies 151 and 152 pressurize conduits 167 and 166.

It is a further important feature of the present invention to be able to change or vary the rebound rate of arm 113 in one and preferably in two directions when the blade displacement assembly in operating. Thus, instead of simply dumping working fluid 182 back and forth between reservoir 181 and cylinder 151, it is preferable to provide flow control means, such as valves 184 and 185, which can be used to control or retard the movement of working fluid 181 as it moves between the reservoir and cylinder.

Computer 111, therefore, can be used to close valve 187 so that flow back to reservoir 182 must pass through valve 185, and the computer can change the flow rate setting of valve 185 from the feed rate to another rate, usually a higher rate which is less than full open to the reservoir. As thus controlled by the computer, the arm will descend faster than the normal feed rate but slower than when disengaged.

Similarly, valve 184 can be closed down by the computer from a fully open position so as to retard fluid flow in the direction of cylinder 151 slightly to retard the upward motion of the arm slightly. Such computer adjustment of flow control valves 184 and 185 can be used to optimize or tune the arm reaction rate to maximize the effectiveness of displacement of the blade by assemblies 141.

Finally, computer 111 is preferably coupled to control the speed of drive motor 196 through conductors 197. As will be seen, therefore, computer 111 can be used to control and vary: blade speed, blade displacement, guide assembly positioning, blade cutting force, and the rate of blade descent and the reaction rate of the arm to blade displacement. With this control, blade vibration and oscillation can be controlled and optimized with other operating parameters of the saw. Angle transducer 136, for example, can be used to give feedback to computer 111 to enable control of the feed rate as a function of workpiece width, the positioning of the guide assemblies as a function of width and whether the displacement means 141 are reciprocating the blade, oscillating the blade or not displacing the blade, all as a function of workpiece width. Moreover, blade speed and the cutting force can be coordinated with the other operating parameter to maximize cutting efficiency and accuracy.

What is claimed is:

1. A method of cutting a workpiece with a band saw or the like including the steps of: moving a cutting stretch of a saw blade across said workpiece to effect cutting, and simultaneously varying the force per unit area of said saw blade against said workpiece, wherein the improvement in said method of cutting is comprised of:
    said varying step is accomplished by periodically reducing and thereafter increasing the area of said workpiece engaged by said saw blade by:
    (i) substantially simultaneously displacing said saw blade in opposite directions at two spaced-apart locations along said saw blade by balde guide assemblies having displaceable blade engaging portions to tilt said cutting stretch about said workpiece in a first direction and to reduce said area;
    (ii) thereafter maintaining said cutting stretch tilted in said first direction while moving said saw blade across said workpiece to cut said workpiece and thereby increase said area;
    (iii) thereafter substantially simultaneously displacing said saw blade by said blade engaging portions in opposite directions at two spaced-apart locations along said saw blade to tilt said cutting stretch about said workpiece in a second direction opposite said first direction and to reduce said area; and
    (iv) thereafter maintaining said cutting stretch tilted in said second direction while moving said saw blade across said workpiece to cut said workpiece and thereby increase said area.

2. A method of cutting a workpiece as defined in claim 1 wherein said saw blade is carried by a movable frame, said frame is biased by a biasing force toward said workpiece and is coupled to feed control means formed to control the rate of moving of said frame to feed said saw blade through said workpiece, said frame being further coupled to force control means adjustable independently of said feed control means and formed to apply a support force to said frame less than said biasing force to establish a minimum net force urging said saw blade into cutting contact with said workpiece,
    during said displacing steps, substantially disengaging said feed control means, and controlling moving of said frame by said force control means to free said frame for movement toward and away from said workpiece during displacement of said blade away from and toward said workpiece.

3. A method of cutting a workpiece as defined in claim 2 wherein,
    during said displacing steps, varying one of the frequency, amplitude, speed and duration of dwell of the simultaneous displacement in opposite directions.

4. A band saw including a frame, carriage means movably mounted to said frame and biased for movement toward a workpiece to be cut, an endless saw blade movably mounted to said carriage means and having a cutting stretch oriented for cutting of said workpiece upon movement of said carriage means toward said workpiece and advancement of said saw blade, and adjustable feed control means including a first fluid piston-cylinder assembly coupled between said carriage means and said frame and formed to control the rate of movement of said carriage means toward said workpiece, wherein the improvement in said band saw comprises:
    cutting enhancement means associated with said saw and formed and operable to cause at least one of periodic reduction of the area of said workpiece being cut by said saw blade and periodic increase of the total force applied by said saw blade against said workpiece;
    adjustable force control means including a second fluid piston-cylinder assembly coupled between said carriage means and said frame and formed to enable selection and control of the amount of support force resisting movement of said carriage means toward said workpiece substantially independently of said first fluid piston-cylinder assembly and substantially independently of said cutting enhancement means; and
    said adjustable feed control means being formed for selective substantial disengagement of said first fluid piston-cylinder assembly from control of the rate of movement of said carriage means to enable regulation of movement of said carriage means toward said workpiece primarily by adjustment of said second fluid piston-cylinder assembly during cutting when said cutting enhancement means is in operation.

5. A band saw as defined in claim 4 wherein,
    said band saw includes a pair of spaced apart saw blade guide means each having a movable element,
    said cutting enhancement means is provided by saw blade displacement means coupled to said movable element of said guide means and formed for displacement of said saw blade at spaced-apart locations along said saw blade by displacement of said movable element to produce see-sawing of said cutting stretch relative to said carriage means during cutting to enhance cutting by periodically reducing the area of said workpiece being engaged by the teeth of said saw blade.

6. A band saw as defined in claim 4 wherein,
    said adjustable feed control means includes means formed for selectively controlling the rate of movement of said carriage means in a direction away from said workpiece.

7. A saw assembly as defined in claim 6 wherein,
    said means formed for selectively controlling the rate of movement of said carriage means is formed for control of said movement both toward and away from said workpiece.

8. Band saw apparatus including blade drive means formed for support and movement of a saw blade thereon for cutting of a workpiece, an endless band saw blade mounted to said drive means, a pair of relatively spaced apart blade support assemblies each formed to engage said blade at spaced-apart locations along said blade to define a cutting stretch therebetween, and displacement means formed to periodically displace said blade towrad and away from said workpiece during cutting movement of said blade, wherein the improvement in said band saw apparatus comprises:

said displacement means being mounted to each of said support assemblies and formed for displacement of a blade engaging portions of each of said support assemblies substantially simultaneously in opposite directions to produce alternating tilting of said cutting stretch relative to said blade drive means about a center of said tilting located between said support assemblies to enhance cutting by periodically reducing the area of said workpiece being engaged by said blade and to minimize displacement of said blade drive means in reaction to said tilting.

9. Band saw apparatus as defined in claim 8 wherein, said displacement means is formed for variation of all of:
(a) the frequency of tilting,
(b) the angle of engagement of said cutting edge with said workpiece.

10. Band saw apparatus as defined in claim 8 wherein, said blade drive means includes carriage means movably mounted to a remainder of said saw apparatus for advancement of said saw blade through said workpiece, and said carriage means is further substantially free for movement away from said workpiece in response to reciprocation of said saw blade and is supported by a selected minimum support force against movement toward said workpiece.

11. Band saw apparatus including blade drive means formed for support and movement of a saw blade thereon for cutting of a workpiece having a transverse dimension, an endless band saw blade mounted to said drive means, a pair of relatively spaced-apart blade support assemblies each formed to engage said blade at spaced-apart locations along said blade, and displacement means formed to reciprocate said blade toward and away from said workpiece during cutting movement of said blade, wherein the improvement in said band saw apparatus comprises:

said support assemblies each includes a guide element mounted in engagement with a back edge of said blade;

said displacement means includes, lever means coupled to each of the guide elements and formed for displacement of said guide elements independently of each other for tilting of said blade between said support assemblies about a center of tilting proximate the center of said transverse dimension of said workpiece, a fluid piston-cylinder assembly coupled to said lever means, and control means coupled to actuate and control displacement of said piston-cylinder assembly, and said control means including a flow control valve formed to enable control of the frequency, speed of displacement, dwell, and relative phase of displacement of each of said guide elements.

12. Band saw apparatus including blade drive means formed for support and movement of a saw blade thereon for cutting a workpiece, an endless band saw blade mounted to said drive means, and a pair of relatively spaced-apart blade guide assemblies each formed to engage said blade at spaced-apart locations along said blade to define a cutting stretch therebetween and each being mounted to said band saw apparatus for movement along said blade towrad and away from said workpiece, wherein the improvement in said band saw apparatus comprises:

guide assembly displacement means including control means displacing said guide assemblies during cutting to change the position of said guide assemblies along said blade at least once after entry of said blade into said workpiece to maintain said guide assemblies in close proximity to said workpiece substantially throughout cutting of said workpiece; and blade displacement means coupled to displace said blade relative to said workpiece to effect enhancement of the cutting rate of said blade through said workpiece.

13. A method of cutting a workpiece as defined in claim 12 wherein,
said changing step and said varying step are both accomplished by directly sensing the width of said workpiece at any given depth of cut.

14. Band saw apparatus as defined in claim 12 wherein,
said blade displacement means is formed to reciprocate said cutting stretch toward and away from said workpiece during cutting movement of said blade, and
said blade displacement means is coupled to each of said blade guide assemblies and formed for displacement of a blade engaging portion of each of said blade guide assemblies independently of each other for independent reciprocation of said cutting stretch relative to said blade drive means.

15. A method of cutting a workpiece with a band saw assembly, said saw assembly having a movable carriage biased for movement toward said workpiece, a band saw blade movably mounted to said carriage to effect cutting, feed control means coupled to said carriage and formed to control the rate of movement of said carriage and saw blade toward said workpiece, force control means coupled to said carriage and formed to apply a controlled supporting force to said carriage to control of the minimum force applied by said carriage to said band saw blade during cutting, and cutting enhancement means associated with said saw assembly and formed to produce periodic increases in the cutting pressure of the saw blade teeth engaging said workpiece independently of said force control means, wherein said method is comprised of the steps of:
(a) advancing said saw blade across said workpiece while feeding said saw blade into said workpiece to effect cutting of said workpiece;
(b) during said advancing and feeding step, enhancing the rate of cutting said workpiece by periodically increasing the cutting pressure applied by the teeth engaging said workpiece by said cutting enhancement means;
(c) during said step of enhancing the rate of cutting of said workpiece, substantially disengaging said feed control means;
(d) during said disengaging step, controlling the rate of movement of said carriage by controlling said supporting force applied to said carriage through said force control means to produce a controlled minimum force on said blade from said carriage.

16. A method of cutting a workpiece with a band saw as defined in claim 15 wherein, said carriage is provided by a movable saw blade carrying arm gravity biased toward said workpiece, and said adjustable feed control means and said adjustable force control means are each provided by piston-cylinder assemblies coupled to independently adjustable fluid circuits, said assemblies being coupled to apply independent forces supporting the weight of said arm against movement toward said workpiece, and said method further comprises:

said disengaging step being accomplished by adjusting the fluid circuit of said adjustable feed control means so as to support substantially none of the weight of said arm, and said controlling step being accomplished by adjusting the fluid circuit of said adjustable force control means to support a selected amount of the weight of said arm.

17. A method of cutting a workpiece as defined in claim 15 wherein, said step of enhancing is accomplished by employing a saw blade having a varying height dimension along its length.

* * * * *

UNITED STATES PATENT AND TRADEMARK OFFICE
CERTIFICATE OF CORRECTION

PATENT NO. : 4,766,790

DATED : August 30, 1988

INVENTOR(S) : Gerald R. Harris

It is certified that error appears in the above-identified patent and that said Letters Patent is hereby corrected as shown below:

Col. 4, line 11, delete "vibrating" and insert therefor --non-vibrating--.

Col. 7, line 45, delete "alternatively" and insert therefor --. Alternatively--.

Col. 10, line 3, delete "saws" and insert therefor --saw's--.

Col. 10, line 25, delete "autoxatic" and insert therefor --automatic--.

In the Claims:

Claim 1, Col. 19, line 30, delete "balde" and insert therefor --blade--.

Claim 8, Col. 21, line 5, delete "towrad" and insert therefor --toward--.

Claim 8, Col. 21, line 10, delete "portions" and insert therefor --portion--.

Signed and Sealed this

Seventh Day of February, 1989

Attest:

DONALD J. QUIGG

*Attesting Officer*         *Commissioner of Patents and Trademarks*